Aug. 18, 1970     E. S. STODDARD     3,524,303
FILTER STRUCTURE AND METHOD OF MAKING THE SAME
Filed Sept. 13, 1968     5 Sheets-Sheet 1

INVENTOR
EDGAR S. STODDARD
BY
Pringly, Baird, Clayton, Miller & Vogel
ATTYS.

Aug. 18, 1970     E. S. STODDARD     3,524,303
FILTER STRUCTURE AND METHOD OF MAKING THE SAME
Filed Sept. 13, 1968     5 Sheets-Sheet 3

FIG. 6

United States Patent Office 3,524,303
Patented Aug. 18, 1970

3,524,303
FILTER STRUCTURE AND METHOD OF MAKING THE SAME
Edgar S. Stoddard, 626 S. Columbia St., Naperville, Ill. 60540
Filed Sept. 13, 1968, Ser. No. 759,606
Int. Cl. B01d 39/08
U.S. Cl. 55—283    28 Claims

ABSTRACT OF THE DISCLOSURE

A filter structure comprising a plurality of electrically insulating warp fibers, a woof fiber interlaced with the warp fibers, an electric heating element including an electrically resistive continuous woof wire interlaced with the warp fibers and in thermal contact therewith, the woof wire alternating with the woof fiber to provide a length of the woof fiber between adjacent lengths of the woof wire, and a pair of electrical terminals connecting an electric potential to the woof wire for heating the woof wire to a temperature to clean the filter structure by destroying the combustible materials entrapped on the filter structure. Disposed in the border of the filter structure is a rigidifying means such as an epoxy coating to support the electrical terminals and any necessary electrical and mechanical connections. There may be provided a number of adjacent filter units wherein the heating element in the upstream one of the filter units applies a greater number of B.t.u.'s to its filter unit than the heating elements in succeeding filter units apply thereto.

---

This invention relates to a filter structure that is cleaned by energizing a heating element provided therein.

The present invention is useful in air filters such as those associated with heating systems, air conditioning systems, ventilating systems, and the like. Such air filters must be cleaned or replaced regularly in order to maintain the efficiency of the apparatus and systems with which or in which the filters are incorporated. The cleaning and replacement of such filters are often neglected because of the cost thereof, the difficulty of effecting cleaning and replacement. Moreover, the debris associated with the filter render the replacement and cleaning distasteful to the user.

Accordingly, it is an important objective of the present invention to provide a self-cleaning filter structure for filtering air and the like comprising a plurality of electrically insulating warp fibers disposed in a longitudinally extending and laterally spaced apart relationship, at least one electrically insulating continuous woof fiber interlaced with the warp fibers, an electric heating element including an electrically resistive continuous woof wire interlaced with the warp wires and in thermal contact therewith, the assembly of the woof fibers and the warp fibers and the woof wire being porous to permit the passage of air therethrough while filtering entrained materials therefrom, and a pair of electrical terminals connected to the woof wire for connection to a source of electric potential for heating the woof wire, the woof wire being heatable to a temperature to clean the filter structure by heating to destruction the combustible materials entrapped thereon.

In connection with the foregoing object, another object of the invention is to construct the woof fiber and the warp fibers to be chemically stable at temperatures up to about 1,000° F., and to heat the woof wire to a temperature in the range from about 700° F. to about 1,000° F.

The filter may be made by the steps of continually withdrawing a plurality of electrically insulating continuous warp fibers along a longitudinal path and in a laterally spaced apart relationship and defining three adjacent sections of the warp fibers, continually interlacing at least one electrically insulating continuous woof fiber with the warp fibers in each of the sections to provide a continuous strip of an electrically insulating fabric, continually interlacing an electrically resistive continuous woof wire with the warp fibers in the centrally disposed one of the sections in longitudinally spaced apart areas in the fabric to provide laterally extending wire lengths substantially uniformly spaced apart in each area, the interlacing of the warp and woof fibers in the outer ones of the sections defining continuous longitudinally extending insulating border regions and the interlacing of the warp and woof fibers in the spaces between the areas defining laterally extending insulating border regions, and laterally severing the fabric and the woof wire in the laterally extending insulating border regions to provide self-cleaning filter structures each surrounded by an insulating border region.

In connection with the foregoing objects, another object of the invention is to introduce a rigidifying composition into the longitudinally extending insulating border regions and into the laterally extending insulating border regions, and to connect a pair of electrical terminals to the portion of the continuous woof wire disposed in each of the fabric areas.

A further object of the invention is to provide in an appliance a self-cleaning filter structure comprising an appliance frame carrying a plurality of first fastener elements, a filter body of a porous filter medium having a large central area and a border region surrounding the central area, the filter medium being both electrically insulating and chemically stable at temperatures up to about 1,000° F., an electric heating element including an electrically resistive wire in thermal contact with the filter body, rigidifying means in the border region to provide support for the filter body, a pair of electrical terminals mounted in the border region and connected to the electrically resistive wire for connection to a source of electric potential for heating the wire, the electrically resistive wire being heatable to a temperature in the range from about 700° F. to about 1,000° F. to clean the filter body by heating to destruction the combustible materials entrapped thereon, a plurality of second fastener elements attached to the border region and removably connected to the plurality of first fastener elements to mount the filter structure on the appliance frame, and a gasket disposed snugly between the border region and the appliance frame to allow the passage of air between the appliance and the atmosphere substantially only through the filter body.

A still further object of the invetnion is to provide a self-cleaning filter structure comprising first and second adjacent filter units arranged in series relationship with each other in an air stream with the first filter unit being disposed upstream with respect to the second filter unit, the first and second filter units being formed respectively of first and second filter bodies each of a porous filter medium that is both electrically insulating and chemically stable at temperatures up to about 1,000° F., and first and second electric heating elements including respectively first and second electrically resistive wires respectively in thermal contact with the first and second filter bodies, the first and second heating elements including respectively first and second pairs of electrical terminals connected respectively to the first and second electrically resistive wires for coupling to a source of electric potential for heating the electrically resistive wires, the first electric heating element applying a substantially greater number of B.t.u.'s per unit volume to the first filter unit than the second electric heating element applies to the second filter unit.

Further features of the invention pertain to the particular arrangement of the parts of the filtering structure.

The invention, both as to its organization and mode of operation, will best be understood by reference to the accompanying drawings in which.

Figure 1:
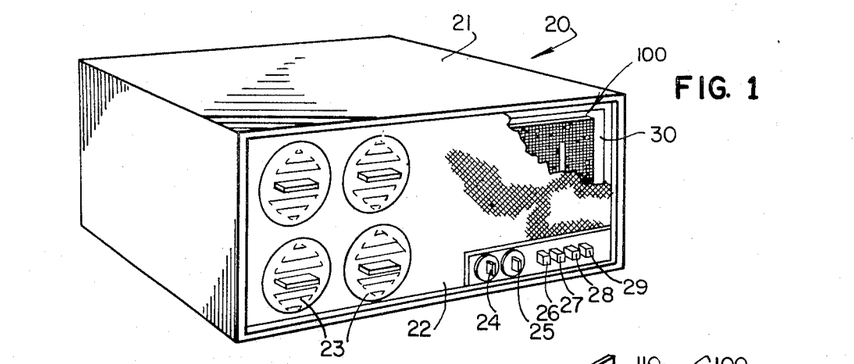
FIG. 1 is a perspective view of an air conditioner incorporating a filter structure made in accordance with and embodying the principles of the present invention.

Referrring now to the drawings and more particularly to FIG. 1 thereof, there is illustrated an air conditioner 20 having a housing 21 and a decorative screen 22 closing the front opening of the housing 21. The air conditioner 20 also includes a set of four vents 23 which are rotatable to permit adjustment of the direction of cooled air coming from the air conditioner 20. There is provided a control knob 24 which serves as a thermostat, a control knob 25 which is adjustable to open and close an external vent, an on-off button 26, a button 27 for controlling only the air conditioner fan, a button 28 for operating the air conditioner 20 in its "low" cool condition, and a button 29 to operate the air conditioner 20 in a "high" cool condition. There is also provided a mounting frame 30 for mounting a filter structure 100 thereon. Although the filter structure 100 will subsequently be described as being used in the air conidtioner 20, it is to be understood that the filtering structure 100 may be associated with and form a part of a heating system, a ventilating system, and the like.

Figure 2:
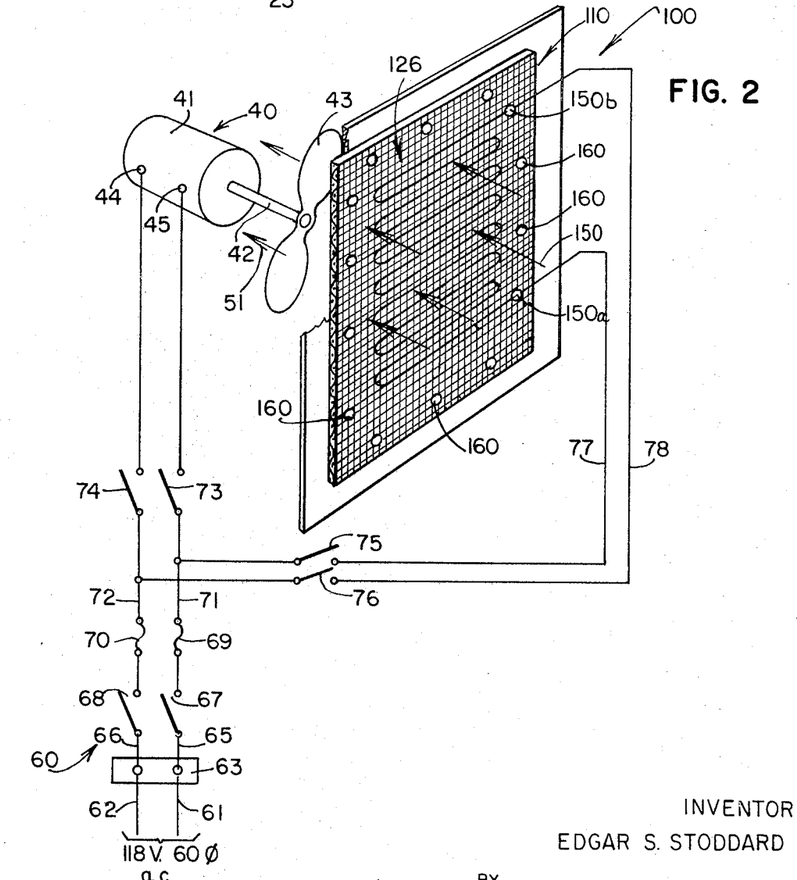
FIG. 2 is a schematic and diagrammatic illustration of the filtering system used in the air conditioner of FIG. 1.

Referring to FIG. 2 of the drawings, the system in which the filter structure 100 is used will now be described. The air conditioner 20 includes a fan 40 which serves to draw air into a stream designated by the arrows 50 and is disposed on the upstream side of the filter structure 100. Air is drawn through the filter structure 100 to provide a filtered stream 51 of air on the downstream side of the filter structure 100. The air conditioner then cools the filtered stream 51 and blows it into the room. The fan 40 more particularly includes an electric motor 41 having an output shaft 42 to which is connected the usual fan blade 43 suitable to create the stream 51 of unfiltered air. The motor 41 is provided with a pair of input terminals 44 and 45 to which there is applied operating potential for the motor 41 to cause operation of the fan 40.

The fan 40 is powered from a conventional household electric supply in the form of a 118-volt, 60-cycle, single phase, A.C. Edison supply 60 including a pair of input conductors 61 and 62 terminating at a terminal block 63 and connected to a pair of main conductors 65 and 66, respectively. The conductors 65 and 66 are selectively connected by main switches 67 and 68, respectively, through fuses 69 and 70, respectively, to a pair of conductors 71 and 72, respectively. The conductors 71 and 72 are respectively connected to the input terminals 44 and 45 on the motor 40 by way of fan switches 73 and 74. The conductors 71 and 72 are also connected, by way of filter switches 75 and 76, through conductors 77 and 78, respectively, to the terminals 150 and 151 of the filter structure 100. When the switches 67, 68, 73, and 74 are closed, electric power is supplied to the fan 40 for actuation thereof, and, when the switches 67, 68, 75, and 76 are closed, electric power is supplied to the filter structure 100 for activation thereof as will be described more fully hereinafter.

Figures 3, 4, 5:
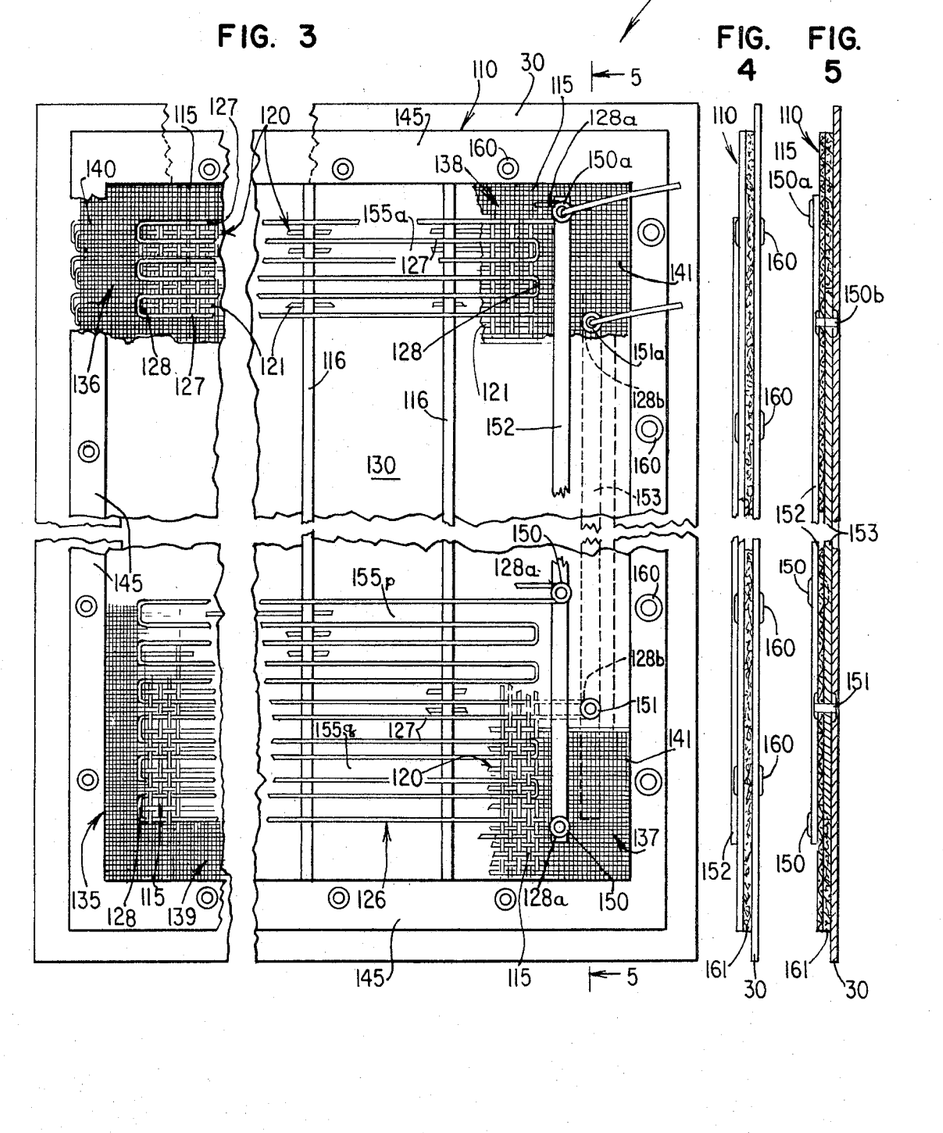
FIG. 3 is an enlarged fragmentary front elevational view of the filter structure of FIG. 2 with portions broken away.
FIG. 4 is an end elevational view of the filter structure of FIG. 3.
FIG. 5 is a view in vertical cross section of the filter structure of FIG. 3 along the lines 5—5 thereof.

Referring now more specifically to FIGS. 3 to 5, the details of the filter structure 100 will now be described. As is best seen in FIG. 3, the filter structure 100 is essentially rectangular in shape and includes a filter body 110. The filter body 110 is specifically in the form of a woven cloth comprising a plurality of electrically insulating warp fibers 115 disposed in a longitudinally extending and laterally spaced apart relationship. If necessary, there may also be included some laterally spaced strengthening warp fibers 116 having a gauge substantially greater than the gauge of the remainder of the warp fibers 115 to lend support to the filter body 110 by reducing the amount of longitudinal sagging thereof. In the embodiment shown, two such strengthening warp fibers 116 were provided, each having a gauge three times the gauge of the warp fibers 115.

There is also provided a continuous woof fiber 120 interlaced with the warp fibers 115 along a sinuous path therethrough, to define a plurality of uniformly spaced, laterally extending fiber lengths 121. The filter structure 100 further comprises an electric heating element including an electrically resistive continuous woof wire 126 interlaced with the warp fibers 115 along a sinuous path therethrough to define a plurality of uniformly spaced, laterally extending wire lengths 127, adjacent ones of the wire lengths 127 being respectively joined by a plurality of loop ends 128. The woof wire 126 alternates with the woof fiber 120 to provide a laterally extending wire length 127 between adjacent laterally extending fiber lengths 121. As a result, the adjacent wire lengths 127 are spaced from each other and therefore electrically insulated from each other, the fiber lengths 121 providing good electrical insulation. It is, of course, necessary that the assembly of the warp fibers 115 and the woof fiber 120 and the woof wire 126 be porous to permit the passage of air therethrough while filtering entrained materials therefrom.

As is clearly shown in FIG. 3, the heating element consisting of the woof wire 126 extends throughout a portion of the woven cloth defined by the warp fibers 115 and the woof fiber 120, this portion being referred to as a central area 130. The portion surrounding the central area 130 constitutes an insulating border region 135 including longitudinally extending border regions 136 and 137 and laterally extending border regions 138 and 139. One or more border woof fibers 140 are interlaced with the warp fibers 115 in the longitudinally extending border region 136 so as to fill the voids therein and preferably to provide a weave tighter than the weave in the central area 130. Similarly, a border woof fiber 141 is interlaced with the warp fibers 120 in the longitudinally extending border region 137 so as to fill the voids therein and to provide a weave tighter than the weave in the central area 130. In the laterally extending border regions 138 and 139, the laterally extending fiber lengths 121 are substantially closer together than are the fiber lengths 121 in the central area 130, thereby to provide a tighter weave in the laterally extending border regions 138 and 139.

For the purpose of simplifying the illustration of FIG. 3, only the corners of the filter structure 100 have been shown in detail. It is to be understood, however, that the weave continues through the entire area of the filter structure 100, including that portion hidden by the epoxy coating 145. Moreover, the electrical woof wire 126 is continuous, starting from the upper right-hand corner and terminating in the lower right-hand corner, as is clearly shown in FIG. 2, and does not consist of a number of broken sections, as shown in the drawing of FIG. 3.

Because the filter structure 100 is essentially a woven cloth, it is desirable to add some rigidifying means thereto. In the preferred embodiment shown in FIG. 3, this rigidifying means takes the form of a polymerized solid epoxy resin coating 145 covering substantially the entire insulating border region 135 including the longitudinally extending border regions 136 and 137 and the laterally extending border regions 138 and 139. In the embodiment shown in FIG. 3, the width of the epoxy coating 145 in each of the laterally extending border regions 138 and 139 is relatively narrow and extends from the associated lateral edge of the filter body 110 to a point midway between said edge and the adjacent wire length 127 of electrically resistive continuous woof wire 126. The width of the epoxy coating 145 in the longitudinally extending border regions 136 and 137 is relatively narrow and extends from the left-hand (as viewed in FIG. 3) longitudinal edge of the filter body 110 to a longitudinal line midway between said edge and the woof wire 126. The inner edge of the epoxy coating 145 is spaced from the woof wire 126 to prevent damage to the coating 145 when the wire 126 is heated. The epoxy coating 145 is broken away in the upper and lower right-hand corners of the filter body 110 and in the upper left-hand corner thereof in order to show the interlacing of the woof fibers 120, 140, and 141 with the warp fibers 115. It is to be understood that the epoxy coating 145 may be transparent whereby the fabric material itself may be viewable without breaking away the coating 145.

Selected ones of the loop ends 128 are pulled, so that they extend into the right-hand border region 137. Specifically, the loop ends 128a are pulled to extend part way into the border region 137, and the loop ends 128b are pulled to extend substantially further thereinto. In the embodiment shown in FIG. 3, every third one of the loop ends 128 are pulled into the border region 137. The filter structure 100 further includes a pair of elongated flat bus bars 152 and 153 formed of electrically conductive metal and respectively disposed on the opposite surfaces of the filter body 110 in the right-hand border region 137 thereof. There is provided a plurality of eyelets 150 respectively extending through the loops 128a, through the filter body 110 and through selected points on the bus bar 152 electrically to connect the woof wire 126 to the bus bar 152 and mechanically to mount the bus bar 152 on the filter body 110. There is also provided a plurality of eyelets 151 extending through the loops 128b, through the filter body 110 and through the bus bar 153 electrically to connect the woof wire 126 to the bus bar 153 and mechanically to mount the bus bar 153 on the filter body 110. Two of the eyelets 150 and 151 respectively define electrical input terminals 150a and 151a which are respectively joined by the conductors 77 and 78 to the filter switches 75 and 76, as previously explained with reference to FIG. 2.

The connections of the bus bars 152 and 153 with the woof wire 126 defines a plurality of separate units 155a ... 155p, 155q connected in parallel with each other between the input terminals 150a and 151a. In this embodiment all of the units are identical, and as exemplified by unit 155a, each unit includes six laterally extending wire lengths 127 and five loop ends 128.

Attached to the insulating border region 135 is a plurality of female snaps 160 (or male if the snaps on the air conditioner mounting frame 30 are female). The snaps 160 engage the snaps 31 on the air conditioner mounting frame 30 to mount the filter structure 100 thereon. Disposed snugly between the insulating border region 135 and the air conditioner appliance frame 30 is a gasket 161 to allow the passage of air from the atmosphere into the air conditioner 20 only through the filter body 110.

In operation, the application of 118 volts A.C. to the terminals 150a and 151a will heat the woof wire 126 to a temperature in the range of 700° F. to 1,000° F., the preferred temperature being 850° F. It has been found that at this temperature, lint, organic dust, and other organic materials entrapped on the filter body 110 are heated to destruction, i.e., the combustible materials entrapped on the filter structure 100 are destroyed by heating to the combustion temperature thereof. In order to obtain the desired destruction of the combustible materials on the filter structure 100, the continuous woof wire 126 must be in intimate contact with the active filter structure, namely, the warp fibers 115 and the woof fibers 120 forming the cloth of the filter body 110 in the central area 130 thereof. It will be appreciated that the materials entrapped on the woof wire 126 are also destroyed by heating to the combustion temperature thereof.

In a typical example of the filter structure 100, the external dimensions thereof are 11½ inches by 11 inches; the warp fibers 115 and the woof fibers 120, 140 and 141 each have a diameter of .0375 inch and consist of ten or more fiber glass filaments twisted together; the wire 126 is 26 gauge Nichrome wire; the distance between adjacent warp fibers 115 is $\frac{5}{64}$ inch; there were two units 155 used, each including 23.75 feet of woof wire 126; the electrical resistance of each unit was 64 ohms; the wire 126 when energized by 118 volts, was heated to a dull red condition which produced a temperature suitable for destroying the combustible materials entrapped on the filter structure 100.

Figure 6:
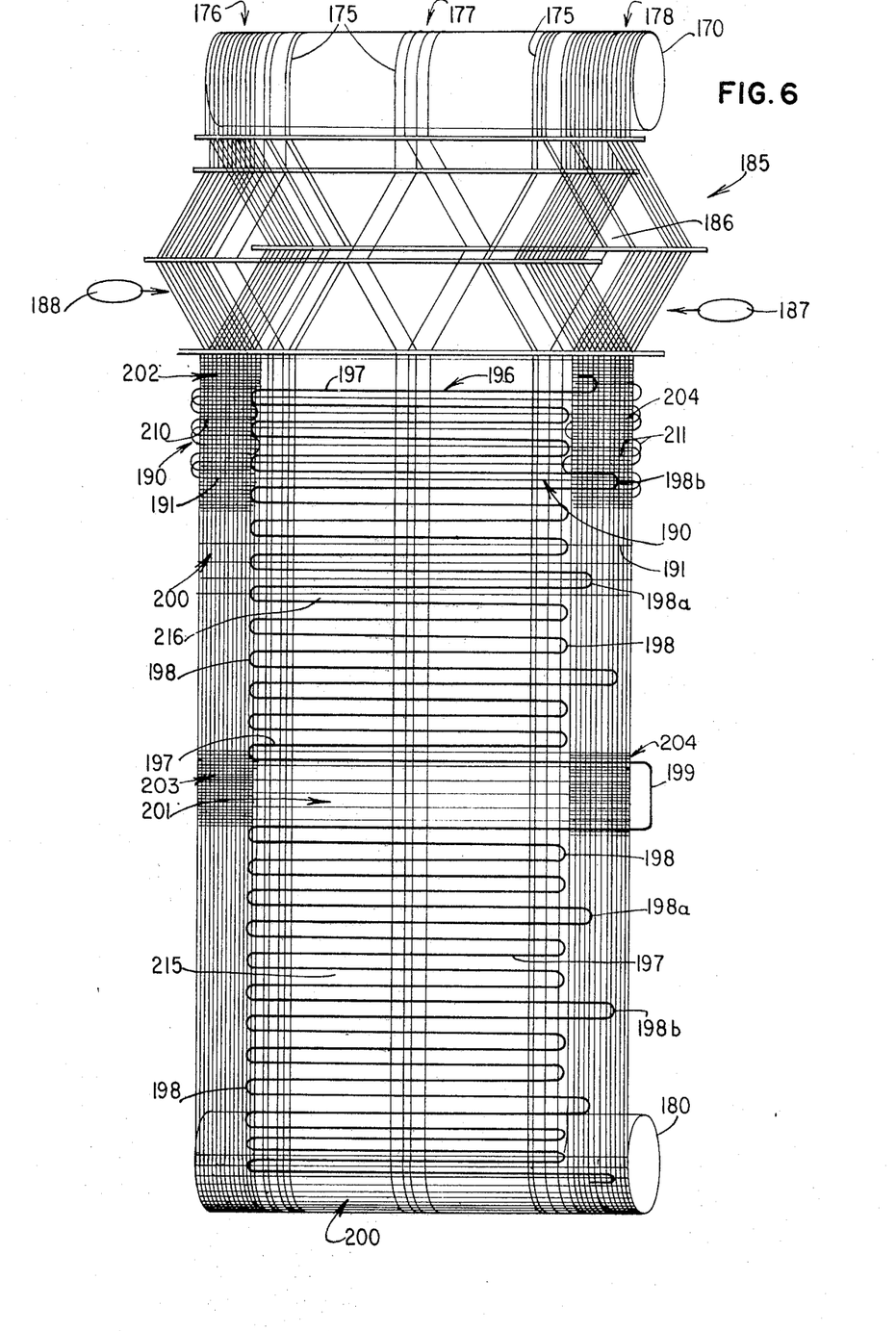
FIG. 6 is a schematic and diagrammatic illustration of exemplary mechanism used in making continuous filter structures, each having the construction shown in FIG. 3.

Referring now to FIG. 6, a way of mass producing the filter structure 100, shown in FIGS. 1 to 5, will be described. There is provided a discharge roller 170 having wound thereon a plurality of electrically insulating continuous warp fibers 175 arranged in a laterally spaced-apart relationship and defining a relatively narrow left-hand (as viewed in FIG. 6) section 176, a relatively wide center section 177 and a relatively narrow right-hand section 178. The warp fibers 175 are withdrawn from the discharge roller 170 and wound around a take-up roller 180 that is longitudinally spaced from the discharge roller 170. The warp fibers 175 pass through a loom 185 which includes standard components and is shown diagrammatically and schematically. The construction shown is not intended in any way to limit the scope of the method to be presently described. The loom 185 includes structure to form a warp shed 186 from the warp fibers 175. There is also provided a fabric shuttle 187 for projecting a woof fiber 190 back and forth through the warp shed 186. The loom 185 further includes a wire shuttle 188 for projecting a woof wire 196 back and forth through the warp shed 186.

More specifically, after a plurality of the warp fibers 175 has been withdrawn from the discharge roller 170 and wound around the take-up roller 180, the loom 185 is operated so that the warp shed 186 has alternate ones of the warp fibers 175 spread apart from the remaining ones of the warp fibers 175. The fabric shuttle 187 is operated to project an electrically insulating continuous woof fiber 190 toward the left (as viewed in FIG. 6) and through the warp shed 186 so as to traverse all of the warp fibers 175 in each of the sections 176, 177 and 178. Drive means (not shown) to the take-up roller 180 is enabled to cause the warp fibers 175 to be continually withdrawn from the discharge roller 170 and wound onto the roller 180. The warp shed 186 is then reversed, and the fabric shuttle 187 is projected back toward the right and through the warp shed 186, so as again to traverse all of the warp fibers 175. The warp shed 186 is repetitively reversed as the woof fiber 190 is projected back and forth therethrough, all while the take-up roller is continually withdrawing warp fibers 175 from the discharge roller 170. This procedure is continued to form a fabric material having a predetermined, relatively short length, such length defining a laterally extending insulating border region 200, shown as being already wound on the take-up roller 180.

The wire shuttle 188 is then operated to project an electrically resistive continuous woof wire 196 through the warp shed 186 but to encompass only the warp fibers 175 in the central section 177. The warp shed 186 is then reversed, and the fabric shuttle 187 is operated to project the woof fabric 190 through the warp shed 186 so as to traverse all of the warp fibers 175 in each of the three sections 176, 177 and 178. The warp shed 186 is then reversed, and the woof wire 196 is projected back through the warp shed 186 again to encompass only the warp fibers 175 in the central section 177. The warp shed 186 is repetitively reversed as the woof fiber 190 and the woof wire 196 are alternatively projected back and forth therethrough, all while the take-up roller is continually withdrawing warp fibers 175 from the discharge roller 170. This procedure is continued to form a predetermined relatively long length of a fabric material having the woof wire 196 interlaced therewith.

The above-described operation produces an electrically insulating continuous woof fiber 190 interlaced with the warp fibers 175 in the sections 176, 177, and 178 and along a sinuous path therethrough to define a plurality of uniformly spaced, laterally extending fiber lengths 191. The electrically resistive continuous woof wire 196 is interlaced with the warp fibers 175 in the section 177 and along a sinuous path therethrough to define a plurality of uniformly spaced, laterally extending wire lengths 197, adjacent wire lengths 197 being respectively joined by a plurality of loop ends 198. The woof wire 196 alternates with the woof fiber 190 to provide a laterally extending wire length 197 between adjacent laterally extending fiber lengths 191. As a result, the adjacent wire lengths 197 are spaced from each other and therefore electrically insulated from each other, the fiber lengths 191 providing good electrical insulation. The assembly of the warp fibers 175, the woof fiber 190, and the woof wire 196 is sufficiently porous to permit the passage of air therethrough while trapping entrained materials thereon.

The wire shuttle 188 is rendered inoperative for a time and the fabric shuttle 187 is operated to project the same continuous woof fiber 190 back and forth through the warp shed 186 as the warp shed 186 is alternated between its two positions, thereby to produce a second laterally extending insulating border region 201 having a length and a weave essentially the same as the length and weave of the laterally extending border region 200. While the border region 201 is being produced, a free length 199 of the woof wire 196 is formed. After the insulating border region 201 is formed, the wire shuttle 188 is again operated to project the same continuous woof wire 196 through the warp shed 186, followed by the projecting of the woof fiber 190 through a warp shed 186 which is reversed. The warp shed 186 is repetitively reversed as the woof fiber 190 and the woof wire 196 are alternately projected back and forth therethrough to form a second, relatively long length of material having the woof wire 196 interlaced therewith and having a construction identical to the first length.

The wire shuttle 188 is again rendered inoperative and the fabric shuttle 187 is operated to project the same continuous woof fiber 190 back and forth throuh the warp shed 186 as the warp shed 186 is alternated between its two positions to provide a third laterally extending insulating border region 202 having a length and a weave essentially the same as the length and weave of the border regions 200 and 201.

Because the woof wire 196 extends only through the warp fibers of the central section 177, the interlacing of the woof fiber 190 and the warp fibers 175 in the left-hand (as viewed in FIG. 6) section 176 defines a continuous longitudinally extending insulating border region 203, and similarly the interlacing of the woof fiber 190 with the warp fibers 175 in the right-hand section 178 defines a longitudinally extending insulating border region 204. During the process of interlacing the woof wire 196 with the warp fibers 175, selected ones of the loop ends 198 are pulled, so that they extend into the right-hand border region 204. Specifically, the loop ends 198a are pulled to extend part way into the border region 204, and the loop ends 198b are pulled to extend substantially further thereinto. The loop ends 198a and 198b are used in a fashion similar to that explained with reference to the loop ends 128a and 128b in the filter structure 100 of FIG. 3.

It may be desirable to interlace one or more border woof fibers 210 with the warp fibers 175 in the left-hand section 176 so as to fill the voids therein and preferably to provide a weave tighter than the weave with the warp fibers in the central section 177. Similarly, a border woof fiber 211 is interlaced with the warp fibers 175 in the right-hand section 178 so as to fill the voids therein and to provide a weave tighter than the weave with the warp fibers 175 in the central section 177.

The above-described procedure provides a continuous strip of material defined by longitudinally spaced-apart areas 215, 216, etc., each containing a portion of the woof wire 196; laterally extending insulating border regions 200, 201, 203, etc. between said areas; and the continuous longitudinally insulating border regions 203 and 204. Because the take-up roller 180 is being continuously driven, the continuous strip of material has been wound therearound and can be shipped, stored, etc. as such. The material on the take-up roller 180 can later be unwound and laterally severed in the laterally extending border regions 200, 201, 202, etc., to provide a plurality of self-cleaning filter structures respectively containing central areas 215, 216, etc. surrounded by insulating border regions.

Alternatively, there need be no take-up roller 180 provided, in which case the completed continuous strip of material is drawn through various additional stations on a mass production line. For example, at one such station, a rigidifying epoxy resin coating (such as the coating 145 shown in FIG. 3) is applied to all of the insulating border regions 200, 201, 202, 203, 204, etc. At the next station, paris of bus bars (such as the bus bars 152 and 153 shown in FIG. 3) are respectively mechanically mounted on the portions of the longitudinally extending border region 204 adjacent to the associated areas 215, 216, etc. and electrically connected to the woof wire 196 by passing eyelets (such as the eyelets 150 and 151 shown in FIG. 3) through the loops 198a and 198b and through the border region 204. Two of the eyelets are then selected as electrical input terminals to which input conductors will be connected.

At a subsequent station, snaps (such as snaps 160 in FIG. 3) may be attached to the insulating border regions 200, 201, 202, 203, 204, etc. for mounting purposes. At the next station, the continuous strip of material is laterally severed in the laterally insulated border regions 200, 201, 202, etc., to provide a plurality of self-cleaning filter structures, each having a construction essentially the same as the filter structure 100 shown in FIGS. 3 to 5.

Figure 7:
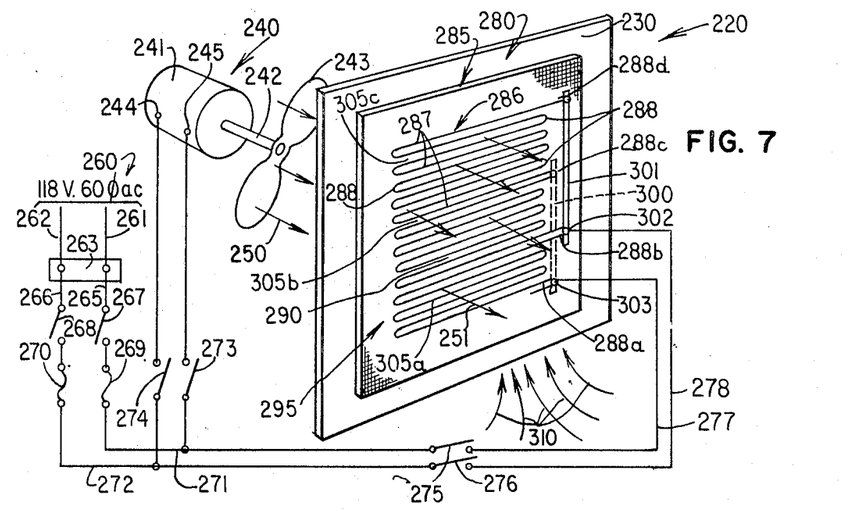
FIG. 7 is a schematic and diagrammatic illustration of a filter structure including a plurality of adjacent units respectively energized at different power levels.

Referring now to FIG. 7 of the drawings, there is illustrated a filtering system 220 constituting a further embodiment of the present invention. The filtering system includes a mounting frame 230 upon which the filter structure 280 will be mounted and also includes a fan 240 having a construction similar to that described with reference to the fan 40 of FIG. 2. More specifically, the fan 240 serves to blow air in a stream designated by the arrows 250 and is disposed upstream of the filter structures 280. Air is blown through the filter structure 280 to provide a filtered stream 251 of air on the downstream side of the filter structure 280. The fan 240 more particularly includes an electric motor 241 having an output shaft 242 to which is connected the usual fan blade 243 suitable to create the stream 251 of unfiltered air. The motor 241 is provided with a pair of input terminals 244 and 245 to which is applied operating potential for the motor 241 to cause operation of the fan 240.

The filtering system 220 is powered from a conventional household electric supply in the form of a 118-volt, 60-cycle, single-phase A.C. Edison supply 260, including a pair of input conductors 261 and 262 terminating at a terminal block 263 and connected to a pair of main conductors 265 and 266, respectively. The conductors 265 and 266 are selectively connected by main switches 267 and 268, respectively, through fuses 269 and 270, respectively, to a pair of conductors 271 and 272, respectively. The conductors 271 and 272 are respectively connected to the input terminals 244 and 245 on the motor 240 by way of a pair of fan switches 273 and 274. The conductors 271 and 272 are also connected, by way of filter switches 275 and 276, through conductors 277 and 278, respectively, to the terminals 302 and 303 of the filter structure 280. When the switches 267, 268, 273, and 274 are closed, electric power is supplied to the fan 240 for actuation thereof, and, when the switches 267, 268, 275, and 276 are closed, electric power is supplied to the filter structure 280 for actuation thereof.

The filter structure 280 is essentially rectangular in shape and includes a filter body 285 in the form of a porous woven cloth comprising electrically insulating warp fibers and woof fibers interlaced in a fashion essentially the same as that described with reference to the filter structure 100 of FIGS. 1 to 5. The filter structure 280 further comprises an electric heating element including an electrically resistive continuous woof wire 286 interlaced in the filter body 285 to define a plurality of uniformly spaced, laterally extending wire lengths 287, adjacent ones of the wire lengths 287 being respectively joined by a plurality of loop ends 288.

The heating element consisting of the woof wire 286 extends throughout the central area 290 of the filter body 285, with the remainder of the filter body 285 constituting an insulating border region 295. There may also be provided an epoxy resin coating in the border region 295 such as the epoxy coating 145 used in the embodiment of FIGS. 1 to 5.

Selected ones of the loop ends 288 are pulled so that they extend into the longitudinally extending right-hand portion of the border region 295. Specifically, in the embodiment shown in FIG. 7, the lower right-hand loop end 288a is pulled to extend part way into the border region 295. The loop end 288b that is removed from the loop end 288a by two intermediate loop ends 288 is pulled to extend substantially further into the border region 295. The loop end 288c that is removed from the loop end 288b by three intermediate loop ends 288 is pulled to extend part way into the border region 295. The loop end 288d that is removed from the loop end 288c by four intermediate loop ends 288 is pulled to extend substantially further into the border region 295.

The filter structure 280 further includes a pair of elongated flat bus bars 300 and 301 formed of electrically conductive metal and respectively disposed on the opposite surfaces of the filter body 285 in the longitudinally extending right-hand portion of the border region 295. Means such as eyelets extend through the loops 288a and 288c, through the filter body 285 and through selective points on the bus bar 300 electrically to connect the woof wire 286 to the bus bar 300 and mechanically to mount the bus bar 300 on the filter body 285. There is also provided means such as eyelets extending through the loops 288b and 288d, through the filter body 285 and through selected points on the bus bar 301 electrically to connect the woof wire 286 to the bus bar 301 and mechanically to mount the bus bar 301 on the filter body 285. Two points respectively on the bus bars 300 and 301 define input terminals 302 and 303 which are respectively joined by the conductors 277 and 278 through the filter switches 275 and 276 to the supply 260.

Consequently, the filler structure 280 consists of a bottom (as viewed in FIG. 7) filter unit 305a, a middle filter unit 305b, and a top filter unit 305c. The bottom filter unit 305a includes the portion of the electrically resistive continuous woof wire 286 disposed between the loop ends 288a and 288b and includes the section of woven material interlaced with that portion. More particularly, the filter unit 305a includes six laterally extending wire lengths 287 and five intermediate loop ends 288 and defines a given predetermined total length of wire between the loop ends 288a and 288b and thus defines a given value of resistance therebetween. The middle filter unit 305b includes the portion of the electrically restistive continuous woof wire 286 disposed between the loop ends 288b and 288c and includes the section of woven material interlaced with that portion. More particularly, the filter unit 305b includes the portion of the electrically resistive 287 and seven intermediate loop ends 288 and defines a total length of wire between the loop ends 288b and 288c, 40% longer than the length of wire between the loop ends 288a and 288b, thereby to provide a resistance between the loop ends 288b and 288c 40% greater than the resistance between the loop ends 288a and 288b. The top filter unit 305c includes the portion of the electrically resistive continuous woof wire 286 disposed between the loop ends 288c and 288d and includes the section of woven material interlaced with that portion. More particularly, the filter unit 305c includes ten laterally extending wire lengths 287 and nine intermediate loop ends 288 and defines a total length of wire between the loop ends 288c and 288d about 30% longer than the length of wire between the loop ends 288b and 288c thereby to provide a resistance between the loop ends 288c and 288d about 30% greater than the resistance between the loop ends 288b and 288c.

Because the bus bar 300 is connected to the loop ends 288a and 288c and because the bus bar 301 is connected to the loop ends 288b and 288d, the three filter units 305a, 305b, and 305c are connected in parallel between the input terminals 302 and 303.

In operation, the application of 118 volts A.C. to the terminals 302 and 303 will supply input power to the woof wire 286 for heating the same. Because of the different values of resistance in the areas 305a, 305b and 305c, a substantial portion of the input power will be applied to the area 305a, a smaller portion of the input power will be applied to the area 305b, and a yet smaller portion of the input power will be applied to the area 305c. In this manner, a substantial number of B.t.u's of heat per unit volume are applied to the area 305a, a lesser number of B.t.u.'s of heat per unit volume are applied to the area 305b, and a yet lesser number of B.t.u.'s of heat per unit volume are applied to the area 305c.

The above-described nonuniform heating of the filter structure 280 has been found to be a more efficient way to clean the same. Assuming that the filter unit 305a lies upstream with respect to the filter unit 305b, and that the filter unit 305b lies upstream with respect to the filter unit 305c, a relatively cool air stream 310 passing over or through the filter unit 305a is heated by the portion of the energized woof wire 286 therein. The heated air passing over or through the filter unit 305b is again heated by the portion of the energized woof wire 286 therein, the twice-heated air stream 310 passing over or through the third filter unit 305c. Accordingly, if the same quantity of heat would be applied by each portion of the woof wire 286 to the associated filter unit, the top filter unit 305c would be heated substantially more than the middle filter unit 305b would be heated; and the middle filter unit 305b would be heated substantially more than the bottom filter unit 305a would be heated. As a result, the filter unit 305a may not be heated sufficiently to adequately clean it, the filter unit 305b may be heated slightly more but perhaps still insufficiently to effect proper cleaning thereof, and the top filter unit 305c may be heated sufficiently to clean it.

The embodiment of the invention illustrated in FIG. 7 and described above overcomes this problem and heats each unit equally by causing the woof wire 286 to apply more power input to the bottom filter unit 305a then is applied to the middle filter unit 305b; by causing the woof wire 286 to apply more power to the middle filter unit 305b than is applied to the top filter unit 305c. The increased power input to the bottom filter unit 305a applies sufficient heat thereto to raise the temperature thereof into the range of 700° F. to 1,000° F., required to clean the unit 305a. The lesser power input to the unit 305b serves to heat that unit sufficiently to raise its temperature into the range of 700° F. to 1,000° F. required to clean the filter unit 305b. The top unit 305c has the least power applied thereto because the air passing thereover is the warmest, so that not as much compensation is needed to raise its temperature into the range of 700° F. to 1,000° F.

Figure 8:
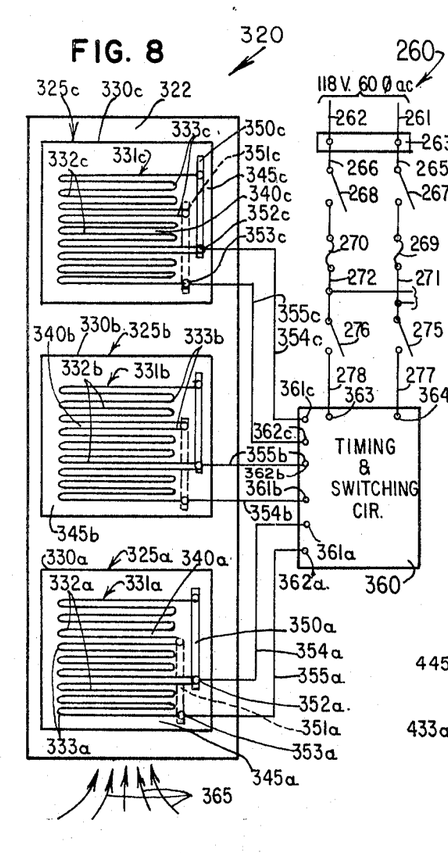
FIG. 8 is a schematic and diagrammatic illustration of a filtering system including three adjacent units energized by a timing and switching circuit.

Turning now to FIG. 8, there is shown a filtering system 320 constituting another embodiment of the present invention, and particularly another system for compensating for the cooling effect of the air stream passing through the filtering system. The filtering system 320 includes a mounting frame 322 upon which is mounted a bottom (as viewed in FIG. 8) filter unit 325a, a middle filter unit 325b, and a top filter unit 325c. The filter units 325a, 325b, and 325c are identical, whereby the ensuing description of the filter 325a is equally applicable to the filter units 325b and 325c.

The filter unit 325a is essentially rectangular in shape and includes a filter body 330a in the form of a porous woven cloth comprising electrically insulating warp fibers and woof fibers that may be interlaced in a fashion essentially the same as that described with reference to the filter structure 100 of FIGS. 1 to 5. The filter unit 325a further comprises an electric heating element including an electrically resistive continuous woof wire 331a interlaced in the filter body 330a to define a plurality of uniformly spaced, laterally extending wire lengths 332a, adjacent ones of the wire lengths 332a being respectively joined by a plurality of loop ends 333a. The heating element consisting of the woof wire 331a extends throughout a central area 340a of the filter body 330a, with the remainder of the filter body 330a constituting an insulating border region 345a. There may also be provided an epoxy resin coating in the border region 345a as explained with reference to the embodiments of FIGS. 1 to 5.

Selected ones of the loop ends 333a are pulled, so that they extend part way into the longitudinally extending right-hand portion of the border region 345a; and other ones of the loop ends 333a are pulled, so that they extend substantially further into the border region 345a. In this embodiment, every third one of the loop ends 333a is pulled into the border region 345a. The filter unit 325a further includes a pair of elongated, flat bus bars 350a and 351a formed of electrically conductive metal and respectively disposed on the opposite surfaces of the filter body 330a in the longitudinally extending righthand portion of the border region 345a thereof. The bus bar 350a is electrically joined to two of the extended loop ends 333a and the bus bar 351a is joined to the other two of the extended loop ends 333a. A point on the bus bar 350a constitutes an input terminal 352a and a point on the bus bar 351a constitutes an input terminal 353a.

Two conductors 354a and 355a are respectively connected to the input terminals 352a and 353a, and are respectively connected to the output terminals 361a and 362a of a timing and switching circuit 360. It is to be understood that the parts of the filter units 325b and 325c that correspond to the parts of the filter unit 325a are labeled with the same reference numerals followed by the appropriate lower case letter.

The timing and switching circuit 360 has a pair of input terminals 363 and 364 respectively coupled to the conductors 277 and 278 which are, in turn, coupled to the source 260. The source 260 is precisely the same as the source 260 shown and described with reference to FIG. 7, and in the interest of brevity no further description will be made with respect thereto.

In operation an electric potential of 118 volts of A.C. is applied from the source to the terminals 363 and 364. The timing and switching circuit 360 applies a potential to the woof wire 331a while no potential is being applied to the woof wires 331b and 331c. Upon completion of a predetermind time interval, the potential is switched from the woof wire 331a and applied to the woof wire 331b for a predetermined time interval less than the time interval that the potential is applied to the woof wire 331a. Upon completion of that time interval, the potential is switched from the woof wire 331b and applied to the woof wire 331c for a predetermined time interval less than the time interval that the potential was applied to the woof wire 331b.

Because the electric potential is applied to the woof wire 331a for the longest period of time, the greatest average power will be applied thereto, so that substantially more B.t.u.'s of heat per unit volume are applied to the filter unit 325a than are applied to the filter unit 325b. And because the electric potential is applied to the woof wire 331b for a longer period of time than it is applied to the woof wire 331c, more power will be applied to the woof wire 331b, so that substantially more B.t.u.'s of heat per unit volume are applied to the filter unit 325b than are applied to the filter unit 325c.

As explained with reference to the embodiment of FIG. 7, this nonuniform heating of the filter units compensates for the air currents so as more efficiently to clean the units 325a, 325b, and 325c. Just as was the case with the filter structure 280 (FIG. 7), the filter unit 325a lies upstream with respect to the filter unit 325b, and the filter unit 325b lies upstream with respect to the filter unit 325c. A relatively-cool air stream 365 passing over or through the filter unit 325a is heated by the energized woof wire 331a therein. The heated air passing over or through the filter unit 325b is again heated by the energized woof wire 331b therein, the twice-heated air stream 365 passing over or through the third filter unit 325c. Accordingly, if the same quantity of heat would be applied by each woof wire to its associated filter unit, the top filter unit 325c would be heated substantially more than the middle filter unit 325b would be heated; and the middle filter unit 325b would be heated substantially more than the bottom filter unit 325a would be heated. The embodiment of the invention illustrated in FIG. 8 and described above overcomes this problem and heats each unit equally by causing the woof wire 331a to apply more average B.t.u.'s of heat per unit volume to the filter unit 325a than the woof wire 331b applies to the filter unit 325b; and by causing the woof wire 331b to apply more average B.t.u.'s of heat per unit volume to the filter unit 25b than the woof wire 331c applies to the filter unit 325c.

Figure 9:
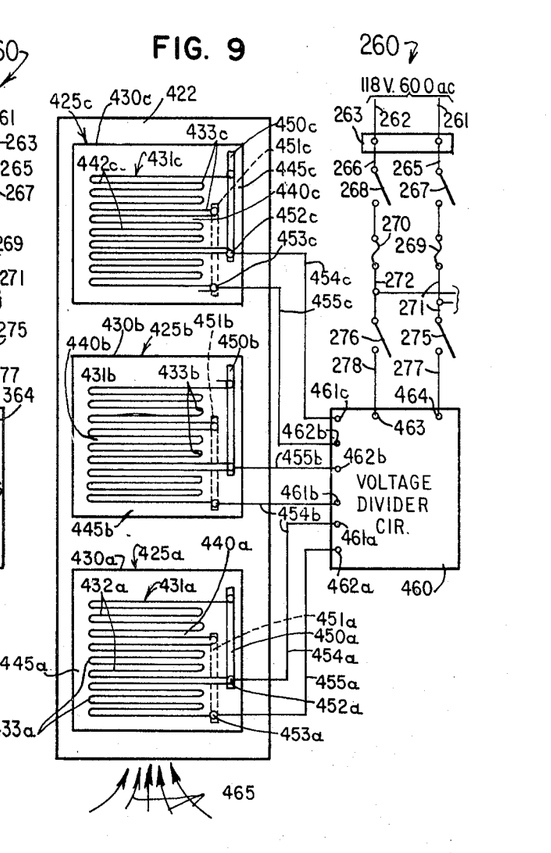
FIG. 9 is a schematic and diagrammatic illustration of altering system including three adjacent units energized by a voltage divider circuit.

Turning now to FIG. 9, there is shown a filtering system 420 constituting another embodiment of the present invention, and particularly another system for compensating for the cooling effect of the air stream passing through the filtering system. The filtering system 420 includes a mounting frame 422 upon which is mounted a bottom (as viewed in FIG. 9) filter unit 425a, a middle filter unit 425b, and a top filter unit 425c. The filter units 425a, 425b, and 425c are identical, whereby the ensuing description of the filter 425a is equally applicable to the filter units 425b and 425c.

The filter unit 425a is essentially rectangular in shape and includes a filter body 430a in the form of a porous woven cloth comprising electrically insulating warp fibers and woof fibers that may be interlaced in a fashion essentially the same as that described with reference to the filter structure 100 of FIGS. 1 to 5. The filter unit 425a further comprises an electric heating element including an electrically resistive continuous woof wire 431a interlaced in the filter body 430a to define a plurality of uniformly spaced, laterally extending wire lengths 432a, adjacent ones of the wire lengths 432a being respectively joined by a plurality of loop ends 433a. The heating element consisting of the woof wire 431a extends throughout a central area 440a of the filter body 430a, with the remainder of the filter body 430a constituting an insulating border region 445a. There may also be provided an epoxy resin coating in the border region 445a as explained with reference to the embodiment of FIGS. 1 to 5.

Selected ones of the loop ends 433a are pulled, so that they extend part way into the longitudinally extending right-hand portion of the border region 445a; and other ones of the loop ends 433a are pulled so that they extend substantially further into the border region 445a. In this embodiment, every third one of the loop ends 433a is pulled into the border region 445a. The filter unit 425a further includes a pair of elongated, flat bus bars 450a and 451a formed of electrically conductive metal and respectively disposed on the opposite surfaces of the filter body 430a in the longitudinally extending right-hand portion of the border region 445a thereof. The bus bar 450a is electrically joined to two of the extended loop ends 433a, and the bus bar 451a is joined to the other two of the extended loop ends 433a. A point on the bus bar 450a constitutes an input terminal 452a and a point on the bus bar 451a constitutes an input terminal 453a.

Two conductors 454a and 455a are respectively connected to the input terminals 452a and 453a, and are respectively connected to the output terminals 461a and 462a of a voltage divider circuit 460. It is to be understood that the parts of the filter units 425b and 425c that correspond to the parts of the filter unit 425a are labeled with the same reference numerals followed by the appropriate lower case letter.

The voltage divider circuit 460 has a pair of input terminals 463 and 464 respectively coupled to the conductors 277 and 278 which are, in turn, coupled to the source 260. The source 260 is precisely the same as the source 260 shown and described with reference to FIG. 7, and in the interest of brevity no further description will be made with respect thereto.

In operation, an electric potential of 118 volts A.C. is applied from the source 260 to the terminals 463 and 464. The voltage divider circuit 460 applies a potential of a given value to the woof wire 431a, a potential of a lesser value to the woof wire 431b and a potential of yet a lesser value to the woof wire 431c. Consequently, more average power is applied to the woof wire 431a than is applied to the woof wire 431b, so that substantially more B.t.u.'s of heat per unit volume are applied to the filter unit 425a than are applied to the filter unit 425b. In addition, more average power is applied to the woof wire 431b than is applied to the woof wire 431c, so that substantially more B.t.u.'s of heat per unit volume are applied to the filter unit 425b than are applied to the filter unit 425c.

As explained with reference to the embodiment of FIG. 7, this nonuniform heating of the filter units compensates for the air currents so as more efficiently to clean the units 425a, 425b, and 425c. Just as was the case with the filter structure 280 (FIG. 7), the filter unit 425a lies upstream with respect to the filter unit 425b, and the filter unit 425b lies upstream with respect to the filter unit 425c. A relatively-cool air stream 465 passing over or through the filter unit 425a is heated by the energized woof wire 431a therein. The heated air passing over or through the filter unit 425b is again heated by the energized woof wire 431b therein, the twice-heated air stream 465 passing over or through the third filter unit 425c. Accordingly, if the same quantity of heat would be applied by each woof wire to its associated filter unit, the top filter unit 425c would be heated substantially more than the middle filter unit 425b would be heated; and the middle filter unit 425b would be heated substantially more than the bottom filter unit 425a would be heated. The embodiment of the invention illustrated in FIG. 9 and described above overcomes this problem and heats each unit equally by causing the woof wire 431a to apply more average B.t.u.'s of heat per unit volume to the filter unit 425a than the woof wire 431b applies to the filter unit 425b; and by causing the woof wire 431b to apply more average B.t.u.'s of heat per unit volume to the filter unit 425b than the woof wire 431c applies to the filter unit 425c.

Figures 10, 12:
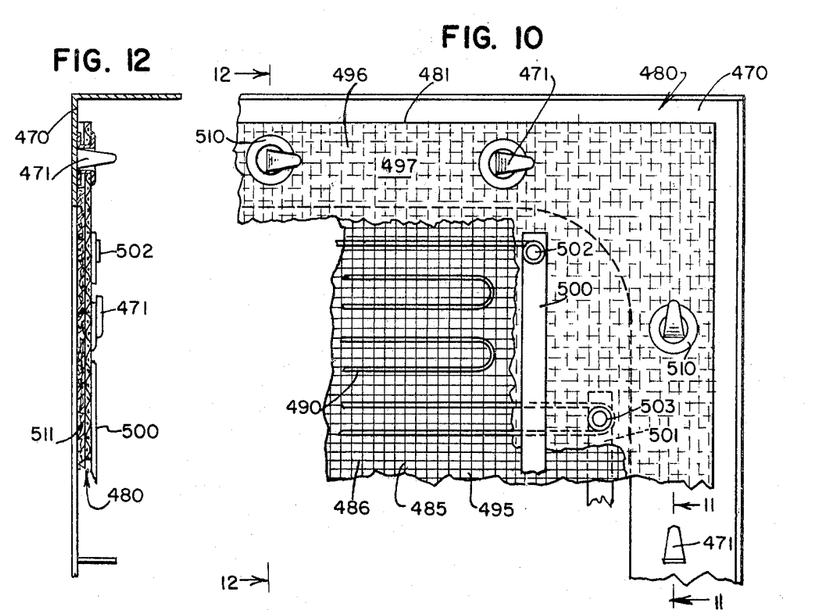
FIG. 10 is a corner view of a filter structure and appliance frame incorporating a second embodiment of structure for mounting the filter on the frame.
FIG. 12 is a view in vertical cross section of the tab on the appliance frame in FIG. 10 along the lines 12—12 thereof.
Figure 11:
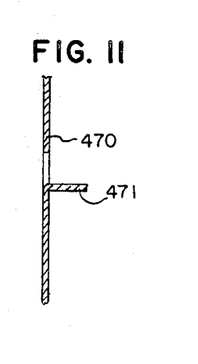
FIG. 11 is a view in vertical cross section of the tab on the appliance frame in FIG. 10 along the lines 11—11 thereof.

Referring now to FIGS. 10 to 12, there is shown a filter structure constituting another embodiment of the present invention. The filter structure 480 is adapted to be mounted on an appliance frame 470 such as that which may be found in an air conditioner. A plurality of tabs 471 is formed at spaced-apart points on the frame 470 and struck out therefrom. The tabs 471 are movable between a position directed outwardly of the frame 471 to a position substantially parallel thereto.

The filter structure 480 is generally of the same construction as the filter structure 400 shown in FIGS. 1 to 5, and, more particularly, includes a filter body 481 in the form of a woven cloth comprising interlaced warp fibers 485 and woof fibers 486. The filter structure 480 also includes a heating element in the form of an electrically resistive continuous woof wire 490 interlaced with the warp fibers 485 and the woof fibers 486 substantially as described with reference to the filter structure 100 of FIGS. 1 to 5. The woof wire 490 extends throughout a portion of the filter body referred to as a central area 495. The portion surrounding the central area 495 constitutes an insulating border region 496. There is provided an epoxy resin coating 497 covering substantially the entire insulating border region 496.

The filter structure 480 further includes a pair of elongated flat bus bars 500 and 501 formed of electrically conductive material and respectively disposed on the opposite surfaces of the filter body 481 in the right-hand longitudinally extending portion of the border region 496. There is provided a plurality (one is shown) of eyelets 502 respectively extending through selected points on the woof wire 490 and the bus bar 500 electrically to connect the woof wire 490 to the bus bar 500 and mechanically to mount the bus bar 500 on the filter body 481. There is also provided a plurality (only one is shown) of eyelets 503 respectively extending through selected points on the woof wire 490 and the bus bar 501 electrically to connect the woof wire 490 to the bus bar 501 and mechanically to mount the bus bar 501 on the filter body 481. Further details of the aspects of the filter structure 480 outlined above are discussed in greater detail with respect to the embodiment of FIGS. 1 to 5.

Attached to the insulating border region 496 is a plurality of eyelets 510 for respectively receiving therethrough the outwardly extending tabs 471 on the appliance frame 470. The tabs are then bent toward the filter structure 480, thereby to mount the filter structure 480 on the appliance frame 470. Disposed snugly between the insulating border region 496 and the appliance frame 470 is a gasket 511 to allow the passage of air between the appliance and the atmosphere only through the filter body 481.

Figure 13:
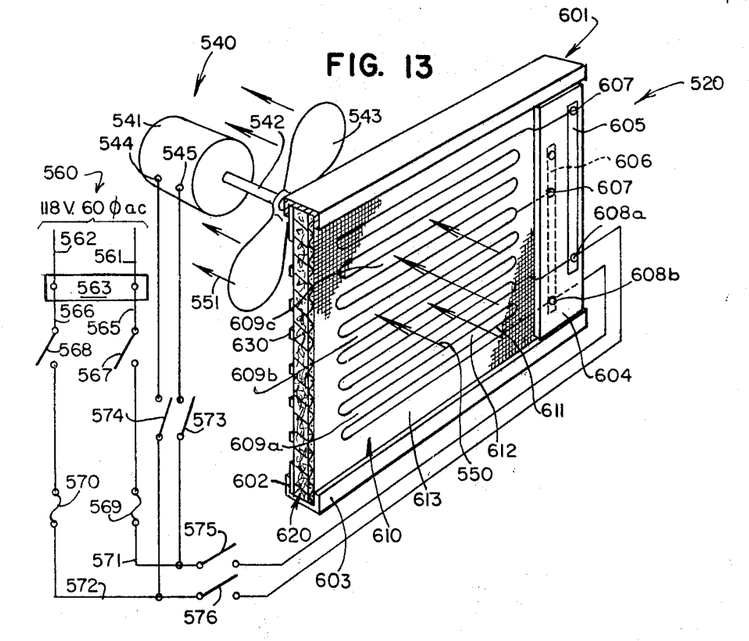
FIG. 13 is a schematic and diagrammatic illustration of a filtering system incorporating the filter structure of FIG. 3.

Referring to FIG. 13 of the drawings, there is illustrated a filtering system 520 constituting yet another embodiment of the present invention. The filtering system 520 may be associated with and form a part of a heating system, an air conditioning system, a ventilating system, and the like, but, as illustrated, it is associated with a ventilating system that includes a fan 540 disposed on the downstream side of the filter structure 600 and draws the air into a stream designated by the arrows 550 to provide a filtered stream 551 of air on the upstream side of the filter structure 600. The fan 540 is powered from a conventional household electric supply 560, the fan 540 and the supply 560 having the same construction respectively as the fan 40 and the supply 60 in the embodiment of FIGS. 1 to 5, and further detailed description thereof will be omitted with respect to the embodiment of FIG. 13. Parts of the fan 540 and the supply 560 are numbered with the same reference numerals used in FIG. 2 but with a factor of 500 added thereto.

The filter structure 600 is essentially rectangular in shape and is enclosed in a frame 601 defining the rectangular shape of filter structure 600 and having a pair of inwardly directed opposed flanges 602 and 603 disposed essentially parallel to each other to hold the various parts of the filter structure 600 in a desired assembled relationship. Fundamentally, the filter structure 600 includes a filter member 610 disposed to the right as viewed in FIG. 13, a batt 620 of glass fibers disposed essentially in FIG. 13 and a perforated metal sheet 630 disposed to the right in FIG. 1; the batt 620 of glass fibers is not self-supporting, whereby the filter member 610 forms a first retainer disposed on one side of the batt 620 and the metal sheet 630 forms a second retainer disposed on the other side of the batt 620, the filter member 610, the batt 620, and the metal sheet 630 all being held in the assembled position by the frame 601, and particularly by the inturned flanges 602 and 603 thereon.

The filter member 610 is specifically in the form of a woven cloth comprising interlaced warp and woof fibers. The filter structure 600 further comprises an electric heating element including an electrically resistive continuous woof wire 611 interlaced with the warp and woof fibers along a sinuous path therethrough. The filter medium 610 is, of course, porous to permit the passage of air therethrough while filtering entrained materials therefrom. The heating element consisting of the woof wire 611 extends throughout a portion of the woven cloth referred to as a central area 612. The portion surrounding the central area 612 constittues an insulating border region 613.

Because the filter structure 600 is essentially a woven cloth, it is desired to add some rigidifying means thereto. In the embodiment shown in FIG. 13, this rigidifying means takes the form of a flat elongated asbestos member 604 covering the right-hand longitudinal portion of the insulating border region 613. In the preferred form a similar asbestos member would cover the left-hand longitudinal portion of the insulating border region 613.

The filter structure 600 further incudes a pair of elongated flat bus bars 605 and 606 formed of electrically conductive metal and respectively disposed on the opposite surfaces of the asbestos member 604 adjacent to the longitudinally extending right-hand portion of the insulating border region 613. There is provided a plurality of eyelets 607 for mounting the bus bars 605 and 606 to the asbestos member 604. Selective points along the woof wire 611 are electrically connected to the bus bar 605, and certain other points on the woof wire 611 are connected to the bus bar 606. Two points respectively on the bus bars 605 and 606 constitute electrical input terminals 608a and 608b. The connections of the bus bars 605 and 606 with the woof wire 611 defines a plurality of separate units 609a, 609b, and 609c connected in parallel with each other between the input terminals 608a and 608b.

The entire assembly comprising the filter structure 600 is porous, the cloth of the filter medium 610 being porous, the batt 620 of glass fibers being porous and the metal sheet 630 being porous. As a consequence, a stream of air toward the fan 540 can be readily drawn therethrough, with dirt, debris, and the like entrained in the air being preferably trapped on the filter member 610 which is placed on the upstream side of the filter structure 600. The batt 630 of glass fibers provides in essence a "back-up" filter member which is usually not needed if the filter structure 600 is cleaned regularly and if the filtering load imposed thereon is not far in excess of that expected during the normal service thereof.

The application of 118 volts A.C. to the terminals 108a and 108b will heat the woof wire 611 to a temperature in the range of 700° F. to 1,000° F., the preferred temperature being 850° F. to destroy organic materials entrapped on the filter body 110. In order to obtain the desired destruction of the combustible materials on the filter structure 600, the wire 611 must be in intimate contact with the active filter structure, namely, the glass fibers forming the cloth of the filter member 110, and must be in intimate contact with the adjacent surface of the batt 620 of glass fibers. This is necessitated by the fact that the glass fibers in both the filter member 610 and the batt 620 as well as the entrapped materials are fundamentally heat insulators and, therefore the woof wire 611 is preferably woven into the filter member 610 and placed directly against the adjacent surface of the batt 620. It will be appreciated that the wire 611 also is a filter member, whereby the materials entrapped thereon are also destroyed by heating to the combustion temperature thereof.

While there has been described what is at present considered to be the preferred embodiments of the invention, it will be understood that various modifications may be made therein, and it is intended to cover in the appended claims all such modifications as fall within the true spirit and scope of the invention.

What is claimed is:

1. A self-cleaning filter structure comprising a plurality of electrically insulating warp fibers disposed in a longitudinally extending and laterally spaced apart relationship, at least one electrically insulating continuous woof fiber interlaced with said warp fibers, said woof fiber and said warp fibers being chemically stable at temperatures up to about 1,000° F., an electric heating element including an electrically resistive continuous woof wire interlaced with said warp fibers and in thermal contact therewith, said woof wire alternating with said woof fiber to provide a laterally extending length of said woof fiber between adjacent laterally extending lengths of said woof wire, the assembly of said woof fiber and said warp fibers and said woof wire being porous to permit the passage of air therethrough while filtering entrained materials therefrom, and a pair of electrical terminals connected to said woof wire for connection to a source of electric potential for heating said woof wire, said woof wire being heatable to a temperature in the range from about 700° F. to about 1,000° F. to clean said filter structure by heating to destruction the combustible materials entrapped thereon.

2. The self-cleaning filter structure set forth in claim 1, wherein said electrically insulating warp fibers and said electrically insulating woof fibers are formed of glass.

3. The self-cleaning filter structure set forth in claim 1, wherein at least one of said electrically insulating warp fibers has a substantially greater gauge than others of said warp fibers to reduce longitudinal sagging of said filter structure when mounted.

4. The self-cleaning filter structure set forth in claim 1, and further comprising means connecting together selected points of said electrically resistive continuous woof wire to define a plurality of wire sections connected in parallel.

5. A self-cleaning filter structure comprising a plurality of electrically insulating warp fibers disposed in a longitudinally extending and laterally spaced apart relationship, at least one electrically insulating continuous woof fiber interlaced with said warp fibers to define a filter body having a central area and a border region surrounding said central area, said woof fiber and said warp fibers being chemically stable at temperatures up to about 1,000° F., an electric heating element including an electrically resistive continuous woof wire interlaced with the warp fibers only in said central area and in thermal contact therewith, said woof wire alternating with said woof fiber in said central area to provide a laterally extending length of said woof fiber between adjacent laterally extending lengths of said woof wire, the assembly of said woof fiber and said warp fibers and said woof wire being porous in said central area to permit the passage of air therethrough while filtering entrained materials therefrom, and a pair of electrical terminals connected to said woof wire for connection to a source of electric potential for heating said woof wire, said woof wire being heatable to a temperature in the range from about 700° F. to about 1,000° F. to clean said filter structure by heating to destruction the combustible materials entrapped thereon.

6. The self-cleaning filter structure set forth in claim 5, wherein said woof wire is sinuously interlaced with said warp fibers to define a plurality of laterally extending wire lengths and a plurality of loop ends joining adjacent pairs of wire lengths, selected ones of said loop ends extending into said border region with some of said selected loops being connected to one of said pair of electrical terminals and others of said selected loops being connected to the other of said pair of electrical terminals.

7. The self-cleaning filter structure set forth in claim 5, wherein only one electrically insulating continuous woof fiber is interlaced with said warp fibers in said central area.

8. The self-cleaning filter structure set forth in claim 5, and further comprising an additional electrically insulating woof fiber interlaced with said warp fibers in the longitudinally extending portions of said border region to provide a tighter weave therein.

9. The filter structure set forth in claim 5, wherein the lengths of said woof fiber in the laterally extending portions of said border region are substantially closer together than are the woof fibers in said central area to provide a tighter weave in said laterally extending border regions.

10. The self-cleaning filter structure set forth in claim 5, further comprising rigidifying means in said border region and surrounding said central area.

11. The self-cleaning filter structure set forth in claim 5, and further comprising a pair of longitudinally extending bus bars mounted on said border region and connecting selected points of said electrically resistive continuous woof wire to said bus bars to define a plurality of wire sections connected in parallel.

12. In an appliance, a self-cleaning filter structure comprising an appliance frame carrying a plurality of first fastener elements, a filter body of a porous filter medium having a central area and a border region surrounding said central area, said filter medium being both electrically insulating and chemically stable at temperatures up to about 1,000° F., an electric heating element including an electrically resistive wire in thermal contact with said filter body, rigidifying means in said border region to provide support for said filter body, a pair of electrical terminals mounted in said border region and connected to said electrically resistive wire for connection to a source of electric potential for heating said wire, said electrically resistive wire being heatable to a temperature in the range from about 700° F. to about 1,000° F. to clean said filter body by heating to destruction the combustible materials entrapped thereon, and a plurality of second fastener elements attached to said border region and removably connected to said plurality of first fastener elements to mount said filter structure on said appliance frame.

13. The self-cleaning filter structure set forth in claim 12, wherein said first fastener elements are a plurality of tabs struck out from said appliance frame, and said second fastener elements are a plurality of eyelets corresponding in number to said tabs and engageable therewith, said tabs being inserted through respective ones of said eyelets and deformed to mount said filter structure on said appliance frame.

14. The self-cleaning filter structure set forth in claim 12, wherein said first fastener elements are a plurality of snaps of one type attached to said appliance frame, and said second fastener elements are a plurality of snaps of an opposite type, said first and second fastener elements snap-engaging to mount said filter structure on said appliance frame.

15. A self-cleaning filter structure set forth in claim 12, wherein said rigidifying means includes at least one longitudinally extending insulating board disposed on said filter body for support thereof.

16. The self-cleaning filter structure set forth in claim 12, wherein said rigidifying means is a solid polymerized epoxy resin.

17. In an appliance, a self-cleaning filter structure comprising an appliance frame carrying a plurality of first fastener elements, a filter body of a porous filter medium having a central area and a border region surrounding said central area, said filter medium being both electrically insulating and chemically stable at temperatures up to about 1,000° F., an electric heating element including an electrically resistive wire in thermal contact with said filter body, rigidifying means in said border region to provide support for said filter body, a pair of electrical terminals mounted in said border region and connected to said electrically resistive wire for connection to a source of electric potential for heating said wire, said electrically resistive wire being heatable to a temperature in the range from about 700° F. to about 1,000° F. to clean said filter body by heating to destruction the combustible materials entrapped thereon, a plurality of second fastener elements attached to said border region and removably connected to said plurality of first fastener elements to mount said filter structure on said appliance frame, and a gasket disposed snugly between said border region and said appliance frame to allow the passage of air between the appliance and the atmosphere substantially only through said filter body.

18. A self-cleaning filter structure for mounting on an appliance frame carrying a plurality of first fastener elements, said filter structure comprising a filter body of a porous filter medium having a central area and a border region surrounding said central area, said filter medium being both electrically insulating and chemically stable at temperatures up to about 1,000 ° F., an electric heating element including an electrically resistive wire in thermal contact with said filter body, rigidifying means in said border region to provide support for said filter body, a pair of electrical terminals mounted in said border region and connected to said electrically resistive wire for connection to a source of electric potential for heating said wire, and said electrically resistive wire being heatable to a temperature in the range from about 700° F. to about 1,000° F. to clean said filter body by heating to destruction the combustible materials entrapped thereon, a plurality of second fastener elements attached to said border region for removable connection to the associated plurality of first fastener elements to mount said filter structure on the associated appliance frame.

19. The self-cleaning filter structure set forth in claim 18, wherein said rigidifying means is a solid polymerized epoxy resin.

20. A self-cleaning filter structure set forth in claim 18, wherein said rigidifying means includes a pair of longitudinally extending insulating boards respectively disposed on the sides of said filter body for support thereof.

21. A self-cleaning filter structure comprising first and second adjacent filter units arranged in series relationship with each other in an air stream with said first filter unit being disposed upstream with respect to said second filter unit, said first and second filter units being formed respectively of first and second filter bodies each of a porous filter medium that is both electrically insulating and chemically stable at temperatures up to about 1,000° F., and first and second electric heating elements including respectively first and second electrically resistive wires respectively in thermal contact with said first and second filter bodies, said first and second heating elements including respectively first and second pairs of electric terminals connected respectively to said first and second electrically resistive wires for coupling to a source of electric potential for heating said electrically resistive wires, said first electric heating element applying a substantially greater number of B.t.u.'s per unit volume to said first filter unit than said second electric heating element applies to said second filter unit, thereby to assure that both said first and second electrically resistive wires are heated to a temperature in the range of from about 700° F. to about 1,000° F. to clean said filter bodies by heating to destruction the combustible materials entrapped thereon.

22. The self-cleaning filter structure set forth in claim 21, wherein said first and second electric heating elements comprise a single continuous electrically resistive wire having a shorter portion of the length thereof defining said first heating element and having a longer portion thereof defining said second heating element.

23. The self-cleaning filter structure set forth in claim 21, and further comprising timing and switching circuit means having an input coupled to the source of electric potential and first and second pairs of outputs respectively coupled to said first and second electric heating elements for sequentially supplying the electric potential thereto, said timing and switching circuit means applying the electric potential to said first heating element for a time interval greater than the time interval in which said timing and switching circuit means applies the electric potential to said second heating element.

24. The self-cleaning filter, structure set forth in claim 21, and further comprising voltage divider circuit means having an input coupled to the source of electric potential and first and second outputs respectively coupled to said first and second electric heating elements for applying a greater portion of the electric potential to said first heating element and for applying a lesser portion of the electric potential to said second heating element.

25. A self-cleaning filter structure comprising a plurality of adjacent filter units arranged in series relationship in an air stream with the first unit in the series being disposed upstream with respect to the adjacent one of the intermediate filter units in the series, said one intermediate filter unit and each succeeding intermediate filter unit being disposed upstream with respect to the next succeeding one of said filter units, each of said filter units being formed respectively of a plurality of filter bodies each of a porous filter medium that is both electrically insulating and chemically stable at temperatures up to about 1,000° F., and a plurality of electric heating elements corresponding in number to said plurality of filter units and each including respectively an electrically resistive wire in thermal contact with the associated filter body and each including a pair of electrical terminals connected to the associated electrically resistive wire for coupling to a source of electric potential for heating said wire, the electric heating element in said first filter unit applying a substantially greater number of B.t.u.'s per unit volume to said first filter unit than the heating element in said one adjacent intermediate filter unit applies thereto, the heating elements in succeeding intermediate filter units applying a substantially greater number of B.t.u.'s per unit volume thereto than the heating elements in the next succeeding filter units apply thereto, thereby to assure that said plurality of electrically resistive wires are heated to a temperature in the range from about 700° F. to about 1,000° F. to clean said filter bodies by heating to destruction the combustible materials entrapped thereon.

26. The self-cleaning filter structure set forth in claim 25, wherein said plurality of heating elements comprises a single continuous electrically resistive wire having a shorter portion of the length thereof defining the heating element in said first filter unit and having successively longer portions thereof respectively defining the heating elements in succeeding ones of said filter units in said series.

27. The self-cleaning filter structure set forth in claim 25, and further comprising timing and switching circuit means having an input coupled to the source of electric potential and a plurality of pairs of outputs respectively coupled to said plurality of electric heating elements for sequentially supplying the electric potential thereto, said timing and switching circuit means applying the electric potential to the heating element in said first filter unit for a time interval longer than the time interval in which said timing and switching circuit means applies said electric potential to the heating element in said one adjacent intermediate said filter unit, said timing and switching circuit means respectively applying said electric potential to the heating elements in succeeding ones of said filter units for successively shorter time intervals.

28. The self-cleaning filter structure set forth in claim 25, and further comprising voltage divider circuit means having an input coupled to the source of electric potential and a plurality of outputs respectively coupled to said plurality of electric heating elements for applying a greater portion of the electric potential to the heating element in said first filter unit and for applying successively lesser portions of the electric potential to the heating elements in succeeding ones of said filter units.

References Cited

UNITED STATES PATENTS

| | | | |
|---|---|---|---|
| 839,797 | 12/1906 | Wood | 55—267 |
| 2,658,742 | 11/1953 | Suter et al. | 263—3 |
| 2,731,541 | 1/1956 | Houdry et al. | 252—416 X |
| 2,815,427 | 12/1957 | Schaefer | 126—299 X |
| 3,001,295 | 9/1961 | Miller | 55—466 X |
| 3,061,942 | 11/1962 | Scofield | 34—82 |
| 3,085,348 | 4/1963 | Adey et al. | 34—82 X |
| 3,102,395 | 9/1963 | Gould | 62—155 |
| 3,268,080 | 8/1966 | Eberly | 210—180 |
| 3,408,794 | 11/1968 | Stoddard | 55—282 |

DENNIS E. TALBERT, JR., Primary Examiner

U.S. Cl. X.R.

23—2; 28—27; 29—611; 34—82; 55—466, 485, 511, 527; 62—262; 263—1